United States Patent [19]

Kim

[11] Patent Number: 6,120,659
[45] Date of Patent: Sep. 19, 2000

[54] DIMENSIONALLY STABLE ELECTRODE FOR TREATING HARD-RESOLUBLE WASTE WATER

[75] Inventor: Hee Jung Kim, 7-305 Asia Seonsuchon Apt., 86, Chamsil-dong, Songpa-gu, Seoul, Rep. of Korea

[73] Assignee: Hee Jung Kim, Seoul, Rep. of Korea

[21] Appl. No.: 09/187,982

[22] Filed: Nov. 9, 1998

[51] Int. Cl.⁷ ................................................. C25B 11/00
[52] U.S. Cl. ................................. 204/290.14; 204/290.01
[58] Field of Search ............................ 204/290 F, 290 R, 204/294, 290.14, 290.01

[56] References Cited

U.S. PATENT DOCUMENTS

| | | | |
|---|---|---|---|
| 4,193,859 | 3/1980 | King | 204/269 |
| 4,226,695 | 10/1980 | Matson | 204/231 |
| 4,288,303 | 9/1981 | Matson | 204/105 R |
| 4,626,334 | 12/1986 | Ohe et al. | 204/290 F |
| 5,587,058 | 12/1996 | Gorodetsky et al. | 204/290 F |

*Primary Examiner*—Bruce F. Bell
*Attorney, Agent, or Firm*—Jacobson, Price, Holman & Stern, PLLC

[57] ABSTRACT

An electrode for treating hard-dissoluble waste water requires high oxygen overvoltage, lowerprice and durability. Conventional electrode can not satisfy all of the above three conditions. The present invention provides an elelctrode capable of satisfying all of the above conditions comprising of novel substrate and novel electrode catalyst. The novel electrode catalyst is a three-element catalyst composed of the oxides of Sn—Pt—Ru, and the novel substrate is a ceramic $Ti_4O_7$. Such system satisfies durability, cost and electrode voltage characteristics.

3 Claims, No Drawings

DIMENSIONALLY STABLE ELECTRODE FOR TREATING HARD-RESOLUBLE WASTE WATER

BACKGROUND OF THE INVENTION

1. Field of the Invention

The present invention relates to a dimensionally stable electrode for treating hard-resoluble waste water.

2. Description of the Related Art

Waste water such as industrial waste water that has many different properties and shapes, high concentration of organic compounds and sometimes strong colors has negative effects to the environment should it not be treated properly. Specifically, the hard-resoluble compounds are extremely slow to decompose because of its complicate molecular structure, but also nearly removable by conventional active slurry process, biochemical, chemical or physical method, or multi-processing thereof because of its poisonous property. Therefore, in the case of treating waste water containing hard-resoluble or harmful organic compounds by slurry processing, a proper pre-treatment technique capable of securing process stability, reducing the load imposed on an aeration container, and increasing bioanalysis yield are essential. So far, Electrochemical or ozone oxiding method has been widely known as an effective method for treating such waste water.

There are many patent applications with regard to the electrochemical method such as Korean Patent application titled Multi-step electrolytic agglutination system (application number: 98-001790), Method for treating dyeing waste water and pigments waste water using electrolysis and heat-energy (application number: 97-020062, publication number: 98-001852), Reagent for treating dyeing waste water using electrolysis (application number: 96-022480, publication number 98-001851), Apparatus for decoloring dyeing waste water (application number: 96-018074, publicaiton number: 97 -074671), Method for decoloring dyeing waste water using chroline compound and electrolysis (application number: 96-014619, publication number 97-074670), carbon electrode using a ceramic binder (application number: 97-033560) and so on.

The electrochemical systems disclosed in the above applications comprised of anode(s) on which oxidation occurs and cathode(s) wherein reduction occurs. The anodes used for oxidation reaction can be divided into soluble anode and non-soluble anode.

The soluble anode is inexpensive but it is hard to purify because second contamination occurs thereon in a large quantity.

Most common non-soluble anode is titanium substrate coated with platinum-family oxide(s). Electrodes for treating waste water requires higher oxygen overvoltage than chlorine generating voltage.

Since conventional electrodes have low chlorine overvoltage, Cl—is easily oxidized to be chroline. The chroline easily reacts with the waste water to secondarily contaminate it. Furthermore, a catalyst for high oxygen overvoltage such as Ru, Pt and Ir is expensive. Especially, an electrode composed of platinum-system catalyst is subject to the following reaction (1) and therefore, its activity disappears.

$$RuO_2(s) + O2RuO_4(sol) \quad (1)$$

Wherein, "s" represents solid state and "sol" represents the state of being gushed from the solution.

When the $RuO_2$ starts to gush, the electrode starts to be damaged, the titanium substrate is subjected to the corrosion and finally, holes occur thereon. Therefore, the life time of the electrode is extremely short.

Incidently, when electrolytic container system stops, $PbO_2$ electrode, which is the second most commonly used electrode, is reduced to be Pb by an instant reverse reaction. Such gushed Pb gives rise to another contamination.

An electrochemical electrode requires the satisfaction of the following three conditions.

(1) cost
(2) voltage
(3) life time

The present invention provides for an electrode that satisfy the above mentioned three conditions.

The oxides of Ru, Ir, Pt, Ti, Pb, etc. can be used as an electrochemical catalyst. However, because such substances are expensive, a substitute electrode is required.

Sn can be considered as an electrode substance for treating waste water according to the present invention, because it is non-platinum type, relatively cheap and has higher oxygen generating volatage than chlorine generating voltage.

The two factors affecting the durability are (i) oxidation-resist property of a substrate and (ii) compatibility of an electrode. Titanium, a common substrate, is susceptible to be easy oxidation and reduced by oxygen and hydrogen respectively. Therefore, titanium oxide($TiO_x$) having strong resistance to oxidation and reduction can be considered as a substitute of Ti. Herein, x is between 1.1 to 2, more preferred, between 1.1 to 1.9, and most preferred, between 1.5 to 1.8.

Considering durability, an electrode catalyst requres higher oxygen overvoltage because platinum-family oxides are oxidized by oxygen to be dissolved. As such catalyst, there are $TiO_2$, $PtO_2$, carbon, $RuO_2$, $SnO_2$ and so on, each of which has good adhesiveness.

With regard to voltage, the electrode catalyst substance having high oxygen overvoltage should be selected. Among conceivable substances, $SnO_2$ is most preferable. If the content of $SnO_2$ is rapidly increased, conductivity also rapidly increases. However, If the content of $SnO_2$ is rapidly increased, at the same time, $SnO_2$ is relatively easily oxidized to be gushed into an electrolyte.

Therefore, considering the characteristics of each electrode catalyst, a two-element or three-element catalyst system is desirable. For example, a catalyst can be considerable which is based on $SnO_2$ having relatively good durability, reasonable price and desirable voltage, and contains more than one additive element capable of intensifying durability.

In case of two-element system of $TiO_2$ and $SnO_2$, if content of $SnO_2$ is over 90 mole %, oxygen overvoltage rapidly decreases and therefore, the durability of the electrode is deteriorated.

With respect to conductivity alone, $PtO_2$ can be considered but it has a problem of stability. Also, carbon has a problem in compatibility with metal elements.

SUMMARY OF THE INVENTION

The object of the present invention is to provide an electrode having high oxygen overvoltage so as to treat waste water more effectively.

To achieve the object of the present invention, an electrode is provided which comprising $SnO_2$ as the main element, $RuO_2$ lower than 10 mole % and Pt lower than 5 mole %, wherein said $SnO_2$ is to control oxygen overvoltage and said $RuO_2$ is to increase conductivity and durability.

DETAILED DESCRIPTION OF THE PREFERRED EMBODIMENT

The method for coating three-element electrode catalyst of $SnO_2$-$RuO_2$-Pt on $Ti_4O_7$ substrate is as follows.
(a) Etching step
  This step is for removing organic and inorganic compounds on the substrate by primarily using 1N-HCl.
(b) Washing step
  After etching, acids on the substrate are removed using pure water.
(c) Dipping step
  The substrate is coated with an electrode catalyst by dipping the substrate into the electrode catalyst solution.
(d) Incinerating step
  The substrate coated with the electrode catalyst is incinerated at a high temperature.
(e) Quality checking step
  Quality check is performed on the coated electrode.

Hereinafter, the present invention will be more explicitly described through the following examples.

EXAMPLE 1

(1) $Ti_4O_7$ susbtrate is prepared as follows.
  (a) A substrate was etched in 1N-HCl solution at 80 Celsius degree for 1 hour.
  (b) The etched substrate was washed with pure water. The surface of the substrate was sufficiently dried.
(2) Electrode catalyst solution was prepared as follows.
  (a) $H_2PtCl_6$-$6H_2O$ as a pre-substance of Pt, $RuCl_4$ as a pre-substance of $RuO_2$ and $SnCL_4$ as a pre-substance of $SnO_2$ were prepared.
  (b) Each pre-substance was measured off so that the mole ratio of Pt:$RuO_2$:$SnO_2$ was 10:10:80 respectively.
  (c) Such measured pre-substances i.e., $SnCl_4$, $RuCl_4$ and $H_2PtCl_6$ were put into isopropyl alcohol(IPA) solvent and then, subjecting the solution to ultra-sonic distribution.
(3) Electrode coating step
  (a) The electrode substrate prepared by (1) was dipped into the solution prepared by (2) for 5 seconds and dried by far-infrared ray at 70 Celsius degrees for 10 minutes.
  (b) The electrode coated with electrode catalyst was incinerated at 480 Celsius degrees for 1 hour at room atmosphere.
  (c) After incineration, it was dried at atmosphere.
  (d) The above processes from a) to c) were repeated.
  (e) By repeating 5 times, the completed electrode was obtained.
(4) Analysis of electrode.
  (a) Oxygen overvoltage was analyzed using potentionstat.
    (i) Oxygen overvoltage was detected using three-electrode analyzing system employing (i) the electrode obtained from (3) as a working electrode, (ii) carbon electrode as a counter electrode and (iii) saturated calomel electrode(SCE) as a auxiliary electrode.
    (ii) 1 Mole of $H_2SO_4$ was used as electrolyte.
  (b) The life time was detected by an acceleration experiment.
    (i) The voltages according to time were detected under the condition of employing the electrode obtained from (3) as an anode, stainless steel as a cathode and 1 Mole $H_2SO_4$ as an electrolyte respectively and imposing $20KA/m^1$ of voltage. Life time is determined at the time when voltage increases.

EXAMPLE 2

(1) Substrate was prepared in the same way as the Example 1.
(2) Electrode catalyst solution was prepared as follows.
  (a) The same procedure as the (2)-(I) of Example 1 was performed.
  (b) Each pre-substance was measured off so that the mole ratio of Pt:$RuO_2$:$SnO_2$ was 10:10:80 respectively.
  (c) The same procedure as the (2)-(c) was performed.
(3) Electrode coating step was perfomed in the same way as (3) of Example 1.
(4) The same analysis process as (4) of Example 1 was performed.

EXAMPLE 3

(1) The pre-treatment was done in the same way as (1) of Example 1.
(2) An electrode catalyst was prepared as follows.
  (a) $SnCl_4$ and $RuCl_4$ were prepared as pre-substance of $SnO_2$ and $RuO_2$.
  (b) The pre-substances are measured off so that the weight ratio of $SnO_2$:$RuO_2$ was 20:80 respectively.
  (c) The measured $SnCl_4$ and $RuCl_4$ were immersed into IPA solvent and then subject to ultra-sonic distribution.
(3) Electrode coating step
  (a) The electrode was washed and dipped in the solution prepared in step (2) for 5 seconds. Thereafter, the electrode was dried at atmosphere level for 10 minutes.
  (b) The dried electrode was incinerated at 480 Celsius degrees for 10 minutes.
  (c) Thereafter, the electrode was again washed with pure water and dried. Then, the above-described processes from (a) to (c) were identically repeated. After repeating the steps 5 times, a completed electrode was obtained.
(4) Analysis of the electrode obtained from (3) was performed in the same way as (4) of Example 1.

EXAMPLE 4

(1) A substrate made of titanum was prepared and pre-treated in the same way as (1) of Example 1.
(2) An electrode catalyst solution was prepared in the same way as (2) of Example 1.
(3) Electrode coating process was completed in the same way as (3) of Example 1.
(4) Electrode analysis was performed in the same way as (4) of Example 1.

Comparative example (1) A substrate made of titanium was pre-treated in the same way as (1) of Example 1.
(2) An electrode catalyst solution was prepared as follows.
  (a) $RuCl_4$ and TPT were prepared as pre-substances of $RuO_2$ and $TiO_2$, respectively.
  (b) $RuCl_4$ and TPT were measured off so that the weight ratio of $RuO_2$:$TiO_2$ was 50:50.
  (c) The $RuCl_4$ measured in step (b) was added into IPA(iso propyl alcohol) of same weight as the sum of $RuCl_4$ and TPT mesured step (b). Thereafter, the solution was subject to ultra-sonic distribution for 1 hour.
  (d) The resultant solution was stirred for 1 hour while TPT was added.

(e) After further adding IPA of the volume at 50 times as that of the solution of (d) thereto, the solution was stirred for 1 day.

(3) Electrode coating process was performed in the same way of (3) of Example 1.

(4) Analysis of the electrode was conducted in the same way as (4) of Example 1.

The results obtained from Examples and Comparison are as follows.

| | ELECTRODE CATALYST (MOLE)//SUBSTRATE | OXYGEN OVER-VOLTAGE | LIFE (TIME) |
|---|---|---|---|
| Example 1 | Pt-RuO2-SnO2 (10:10:80)//Ti4O7 | 160 | 523 |
| Example 2 | Pt-RuO2-SnO2 (5:15:80)//Ti4O7 | 125 | 457 |
| Example 3 | RuO2-SnO2(20:80)//Ti4O7 | 100 | 375 |
| Example 4 | Pt-RuO2-SnO2 (10:10:80)//Ti | 155 | 354 |
| Comparison | RuO2-TiO2 (50:50)//Ti | 80 | 185 |

What is claimed is:

1. An electrode for treating waste water comprising a substrate and an electrode catalyst coated on the surface of said substrate wherein, said electrode catalyst is a multi-element catalyst comprising at least $RuO_2$ and $SnO_2$, said substrate being made of $Ti_4O_7$.

2. The electrode according to claim 1, wherein said electrode catalyst further comprises Pt.

3. The electrode according to claim 2, wherein the ratio of said $Pt:RuO_2:SnO_2$ is 0–20:10–20:80 with respect to mole weight %.

* * * * *